UNITED STATES PATENT OFFICE.

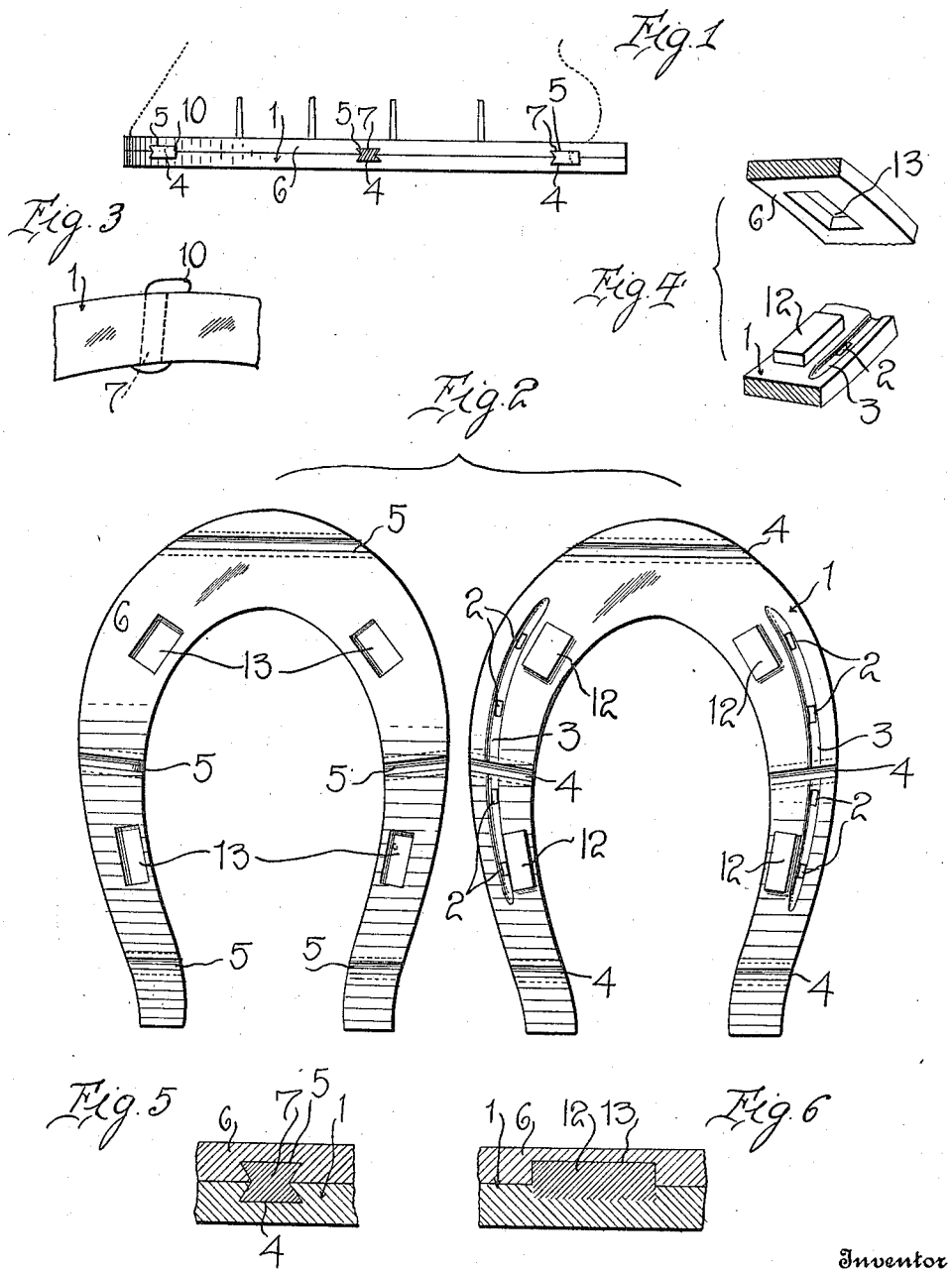

OLIVER ELMORE, OF LOUISVILLE, KENTUCKY.

HORSESHOE.

1,152,497. Specification of Letters Patent. Patented Sept. 7, 1915.

Application filed January 16, 1915. Serial No. 2,650.

*To all whom it may concern:*

Be it known that I, OLIVER ELMORE, a citizen of the United States, residing at Louisville, in the county of Jefferson and State of Kentucky, have invented certain new and useful Improvements in Horseshoes, of which the following is a specification, reference being had to the accompanying drawings.

This invention relates to new and useful improvements in horsehoes and more particularly to a sectional horseshoe, the main object of the present invention being the provision of a horseshoe consisting of two sections, one of which is permanently secured to the horse's hoof, while the other section thereof is detachably connected to the first section, so that it can be quickly and readily removed and replaced by a new one, when so desired.

Another object of the present invention is the provision of a horseshoe whereby said horseshoe may be readily changed to what is known as a rough shod shoe or a smooth one.

A further object of the present invention is the provision of a horseshoe of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawing forming a part of this application, Figure 1 is a side elevation of a horseshoe constructed in accordance with my invention and illustrating the same as applied to the hoof of a horse. Fig. 2 is a plan view of the confronting faces of the two sections of the shoe. Fig. 3 is a detail top plan view of a section of the shoe, illustrating the manner of upsetting the ends of the securing pins. Fig. 4 is a detail perspective view of a portion of each of the sections, illustrating the lug and recess used in retaining the sections against lateral movement. Fig. 5 is a detail transverse sectional view illustrating the top of the securing pins; and Fig. 6 is a similar view illustrating the formation of the lugs.

In carrying out my invention, I provide what is known as a permanent section, generally indicated in the accompanying drawing by the numeral 1 and which is generally in the form of a horseshoe, as shown. The section 1 is provided with the usual nail receiving openings 2 which communicate with arcuate grooves 3. The side portions of the shoe 1 and the intermediate portions are provided with dove-tailed grooves 4 which are adapted to be arranged in opposition with the grooves 5, formed in the removable section 6. From this it will be apparent that when the two sections 1 and 6 are to be connected together, the double dovetailed pins 7 and 10 are arranged within the grooves 4 and 5 to securely connect the two sections together. The pins 7 and 10 having been arranged in position, the ends of the same, which extend through the side portions of each of the sections, are upset.

The section 1 of the shoe, which is permanently secured to the horse's hoof, is provided upon each side portion thereof with spaced lugs 12 which are adapted to extend into recesses 13 formed within the removable section of the shoe to securely hold the two sections against any lateral or longitudinal movement, with respect to each other.

From the above description, taken in connection with the accompanying drawing, it will be apparent that I have provided a simple and durable horse shoe, constructed of separable sections, one of which is permanently secured to the horse's hoof, while the other is detachably connected to the permanent section and, is in the form of either a rough shod or smooth shod section, so that during wintry weather or when the streets are slippery, the smooth shod shoe may be readily changed to what is known as a rough shod shoe and vice-versa. It will also be noted that the two sections may be quickly and readily connected together by placing the sections 6 upon the section 1 and inserting the double dove-tail pins within the grooves 4 and 5 and then upsetting or bending the ends of the pins. From the above it will be apparent that I have provided a simple and durable horseshoe of the character set forth which can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features, or departing from the scope of the invention, as defined by the appended claims.

It will be understood that the pins 7 and 10 may be tapering in form, if so desired, so as to provide a wedging action when inserted within the grooves 4 and 5. From this it will be apparent that after the pins 7 and 10 have been forced into the grooves 4 and 5 and the ends upset or overturned, they will be securely held in place so as to rigidly connect the permanent and the removable sections of the horseshoe.

Having thus described this invention, what I desire to claim and secure by Letters Patent, is:—

1. A device of the class described including a permanent section and a removable section, lugs carried by the permanent section, said removable section having recesses to receive the lugs and retain the sections against lateral movement, with respect to each other, and means for detachably connecting the two sections, as and for the purpose set forth.

2. A device of the class described including a permanent section, and a removable section, lugs carried by said permanent section and arranged in spaced relation, said removable section having recesses adapted to receive said lugs to retain the removable section against lateral movement, each of said sections being provided within the opposed faces thereof with dove-tailed grooves adapted to be arranged in opposed relation, and double dove-tailed pins adapted to be arranged within said grooves whereby to connect the removable section with the permanent section.

In testimony whereof I hereunto affix my signature in the presence of two witnesses.

OLIVER ELMORE.

Witnesses:
DAVID M. COLLINS,
AMBEL SEGEL.

Copies of this patent may be obtained for five cents each, by addressing the "Commissioner of Patents, Washington, D. C."